(12) United States Patent
Salehi et al.

(10) Patent No.: US 12,449,484 B2
(45) Date of Patent: Oct. 21, 2025

(54) BATTERY IMBALANCE DIAGNOSIS AND MITIGATION

(71) Applicant: GM GLOBAL TECHNOLOGY OPERATIONS LLC, Detroit, MI (US)

(72) Inventors: Rasoul Salehi, Ann Arbor, MI (US); Steven Earl Muldoon, Royal Oak, MI (US); Yue-Yun Wang, Troy, MI (US); Wen-Chiao Lin, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 154 days.

(21) Appl. No.: 18/334,015

(22) Filed: Jun. 13, 2023

(65) Prior Publication Data

US 2024/0418789 A1    Dec. 19, 2024

(51) Int. Cl.
*G01R 31/392* (2019.01)
*G01R 31/389* (2019.01)
*G01R 31/396* (2019.01)
*H01M 10/48* (2006.01)
*B60R 16/033* (2006.01)

(52) U.S. Cl.
CPC ......... *G01R 31/392* (2019.01); *G01R 31/389* (2019.01); *G01R 31/396* (2019.01); *H01M 10/482* (2013.01); *B60R 16/033* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 2013/0302657 | A1* | 11/2013 | Itakura | H02J 7/007 |
| | | | | 429/61 |
| 2013/0307334 | A1* | 11/2013 | Middleton | G01R 31/389 |
| | | | | 307/31 |
| 2020/0014220 | A1* | 1/2020 | Srinivasan | H01M 10/48 |
| 2023/0236259 | A1* | 7/2023 | Chae | G01R 31/367 |
| | | | | 324/426 |

* cited by examiner

*Primary Examiner* — Jas A Sanghera
(74) *Attorney, Agent, or Firm* — CANTOR COLBURN LLP (57) ABSTRACT

Techniques are provided for battery imbalance diagnosis and mitigation. In one embodiment, the techniques involve isolating, via a first isolation unit, a first battery cell from a plurality of battery cells, determining, via a complex impedance measurement unit, a state of health of the first battery cell, and controlling, via a controller, the first battery cell based on the state of health of the first battery cell.

20 Claims, 6 Drawing Sheets

BATTERY IMBALANCE DIAGNOSIS AND MITIGATION

INTRODUCTION

The subject disclosure relates to battery cells, and more specifically, to using impedance estimation to detect imbalanced degradation of individual battery cells in a battery pack or cell group.

Traditional battery packs often include individual battery cells that degrade at different rates. A battery pack can supply energy to a load despite the degradation of some of the individual cells. However, using a battery pack that includes degraded cells can reduce performance and reliability, and cause damage to the battery pack.

SUMMARY

In one exemplary embodiment, a method is provided to diagnose and mitigate battery imbalances. The method includes isolating, via a first isolation unit, a first battery cell from a plurality of battery cells, determining, via a complex impedance measurement unit, a state of health of the first battery cell, and controlling, via a controller, the first battery cell based on the state of health of the first battery cell.

In addition to one or more of the features described herein the first isolation unit comprises a first connection point connected to a first end of a switch, and a second connection point connected to a second end of the switch.

In addition to one or more of the features described herein, the method also includes isolating, via a second isolation unit, a second battery cell from the plurality of battery cells, determining, via the complex impedance measurement unit, a state of health of the second battery cell, and determining, via the controller, that a difference between the state of health of the first battery cell and the state of health of the second battery cell exceeds a state of health threshold, the difference indicates that a remaining useful life of the first battery cell is less than a remaining useful life of the second battery cell, and the first battery cell is controlled by disconnecting the first battery cell from the plurality of battery cells via the first isolation unit.

In addition to one or more of the features described herein the first isolation unit comprises a first connection point connected to a first end of switch, a second end of the switch is connected to a first electrical path, and a third end of the switch is connected to a second electrical path, and a second connection point connected to the first electrical path and the second electrical path, the second electrical path includes a resistor or an RC filter.

In addition to one or more of the features described herein, the method also includes determining, via the controller, a target frequency range of a frequency response, determining, via the complex impedance measurement unit, the frequency response across the target frequency range, determining, via the controller, a state of health of the first battery cell based on the frequency response, and determining, via the controller, that a difference between the state of health of the first battery cell and a state of health estimation map exceeds a battery imbalance threshold, wherein the first battery cell is controlled based on the state of health of the first battery cell.

In addition to one or more of the features described herein the complex impedance measurement unit represents a device configured to apply an input AC signal to the first battery cell, measure an output AC signal of the first battery cell, and determine real and imaginary impedance values based on the input AC signal and the output AC signal.

In addition to one or more of the features described herein the state of health of the first battery cell is a map or profile that represents a remaining useful life of the first battery cell relative to at least one metric, the remaining useful life of the first battery cell comprises at least one of an internal impedance value, a number of expected remaining life cycles, or a percentage of remaining charge, and the at least one metric comprises time, a cycle count, a temperature range, a voltage or current usage, or a capacity range of the first battery cell.

In another exemplary embodiment, a vehicle power control system is provided to diagnose and mitigate battery imbalances. The system includes a plurality of battery cells, a first isolation unit, a complex impedance measurement unit, a processor, and memory or storage comprising an algorithm or computer instructions, which when executed by the processor, performs an operation comprising isolating, via the first isolation unit, a first battery cell from the plurality of battery cells, determining, via the complex impedance measurement unit, a state of health of the first battery cell, and controlling, via the processor, the first battery cell based on the state of health of the first battery cell.

In addition to one or more of the features described herein the first isolation unit comprises a first connection point connected to a first end of a switch, and a second connection point connected to a second end of the switch.

In addition to one or more of the features described herein, the operation also includes isolating, via a second isolation unit, a second battery cell from the plurality of battery cells, determining, via the complex impedance measurement unit, a state of health of the second battery cell, and determining, via the controller, that a difference between the state of health of the first battery cell and the state of health of the second battery cell exceeds a state of health threshold, the difference indicates that a remaining useful life of the first battery cell is less than a remaining useful life of the second battery cell, and the first battery cell is controlled by disconnecting the first battery cell from the plurality of battery cells via the first isolation unit.

In addition to one or more of the features described herein the first isolation unit comprises a first connection point connected to a first end of switch, a second end of the switch is connected to a first electrical path, and a third end of the switch is connected to a second electrical path, and a second connection point connected to the first electrical path and the second electrical path, the second electrical path includes a resistor or an RC filter.

In addition to one or more of the features described herein, the operation also includes determining, via the controller, a target frequency range of a frequency response, determining, via the complex impedance measurement unit, the frequency response across the target frequency range, determining, via the controller, a state of health of the first battery cell based on the frequency response, and determining, via the controller, that a difference between the state of health of the first battery cell and a state of health estimation map exceeds a battery imbalance threshold, wherein the first battery cell is controlled based on the state of health of the first battery cell.

In addition to one or more of the features described herein the complex impedance measurement unit represents a device configured to apply an input AC signal to the first battery cell, measure an output AC signal of the first battery cell, and determine real and imaginary impedance values based on the input AC signal and the output AC signal.

In addition to one or more of the features described herein the state of health of the first battery cell is a map or profile that represents a remaining useful life of the first battery cell relative to at least one metric, the remaining useful life of the first battery cell comprises at least one of an internal impedance value, a number of expected remaining life cycles, or a percentage of remaining charge, and the at least one metric comprises time, a cycle count, a temperature range, a voltage or current usage, or a capacity range of the first battery cell.

In yet another exemplary embodiment a computer-readable storage medium having a computer-readable program code embodied therewith is provided to diagnose and mitigate battery imbalances. The computer-readable program code executable by one or more computer processors to perform an operation comprising isolating, via a first isolation unit, a first battery cell from a plurality of battery cells, determining, via a complex impedance measurement unit, a state of health of the first battery cell, and controlling, via a controller, the first battery cell based on the state of health of the first battery cell.

In addition to one or more of the features described herein the first isolation unit comprises a first connection point connected to a first end of a switch, and a second connection point connected to a second end of the switch.

In addition to one or more of the features described herein, the operation also includes isolating, via a second isolation unit, a second battery cell from the plurality of battery cells, determining, via the complex impedance measurement unit, a state of health of the second battery cell, and determining, via the controller, that a difference between the state of health of the first battery cell and the state of health of the second battery cell exceeds a state of health threshold, the difference indicates that a remaining useful life of the first battery cell is less than a remaining useful life of the second battery cell, and the first battery cell is controlled by disconnecting the first battery cell from the plurality of battery cells via the first isolation unit.

In addition to one or more of the features described herein the first isolation unit comprises a first connection point connected to a first end of switch, a second end of the switch is connected to a first electrical path, and a third end of the switch is connected to a second electrical path, and a second connection point connected to the first electrical path and the second electrical path, the second electrical path includes a resistor or an RC filter.

In addition to one or more of the features described herein, the operation also includes determining, via the controller, a target frequency range of a frequency response, determining, via the complex impedance measurement unit, the frequency response across the target frequency range, determining, via the controller, a state of health of the first battery cell based on the frequency response, and determining, via the controller, that a difference between the state of health of the first battery cell and a state of health estimation map exceeds a battery imbalance threshold, wherein the first battery cell is controlled based on the state of health of the first battery cell.

In addition to one or more of the features described herein the state of health of the first battery cell is a map or profile that represents a remaining useful life of the first battery cell relative to at least one metric, the remaining useful life of the first battery cell comprises at least one of an internal impedance value, a number of expected remaining life cycles, or a percentage of remaining charge, and the at least one metric comprises time, a cycle count, a temperature range, a voltage or current usage, or a capacity range of the first battery cell.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term "unit" refers to circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure improve upon battery cell diagnosis and mitigation systems by providing a battery imbalance mitigation module configured to isolate, diagnose, and control cells in a battery pack or cell group (e.g., individual battery cells connected in series or parallel). The battery imbalance mitigation module can isolate each cell of the battery pack or cell group via an isolation unit associated with the respective cell. Further, the battery imbalance mitigation module can diagnose each cell based on a frequency response of the respective cell to a complex impedance measurement unit. Further, the battery imbalance mitigation module can control the isolation units to mitigate the effects of using the battery pack or cell group that includes a cell with a battery imbalance (e.g., a degradation of the cell due to aging).

One benefit of the disclosed embodiments is to reduce performance issues of using battery packs or cell groups that include degraded cells by controlling or disabling the use of the degraded cells. Further, embodiments of the present disclosure can improve the performance, reliability, and longevity of the battery packs or cell groups by correcting imbalances in cells of the battery packs or cell groups.

Figure 1:
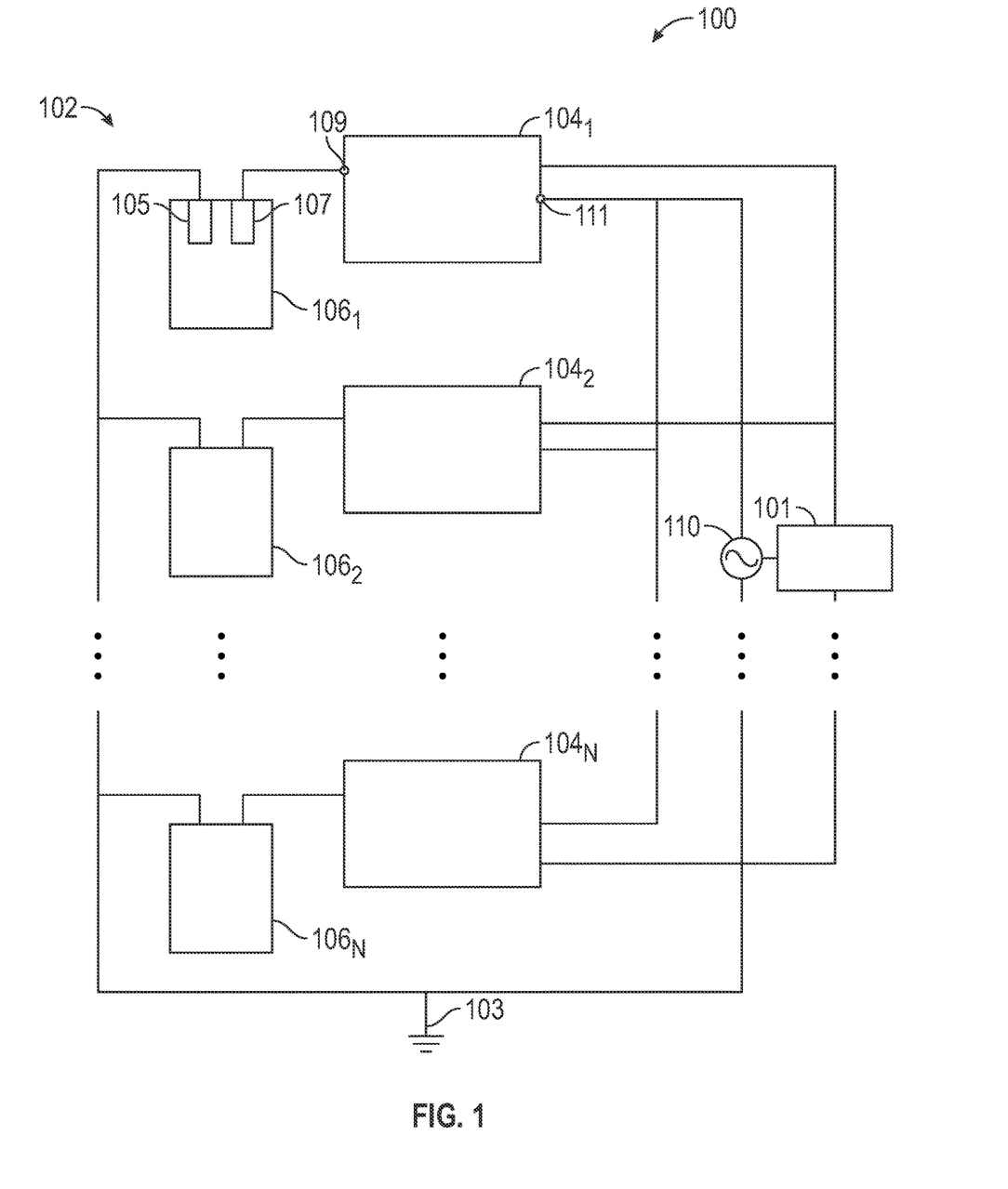
FIG. 1 illustrates a battery control environment, according to one embodiment.

FIG. 1 illustrates a battery control environment 100, according to one embodiment. In the illustrated embodiment, the battery control environment 100 includes a circuit configuration 102 (which includes isolation units $104_{1-N}$, cells $106_{1-N}$, and a power source 110), and a controller 101.

In one embodiment, the isolation units $104_{1-N}$ represent circuit configurations operable to connect and disconnect the cells $106_{1-N}$ from the circuit configuration 102. Each of the isolation units $104_{1-N}$ can include at least two input or output connection points to the circuit configuration 102. The isolation units $104_{1-N}$ can also include connection points to the controller 101 and to ground 103.

In the illustrated embodiment, each of the cells $106_{1-N}$ includes an anode (e.g., anode 105) connected to ground 103, and a cathode (e.g., cathode 107) connected to a first connection point (e.g., connection point 109) of a corresponding isolation unit. The power source 110 is connected to ground 103, connected to a second connection point (e.g., connection point 111) of each of the isolation units $104_{1-N}$, and connected to the controller 101.

In one embodiment, the controller 101 is configured to operate circuit elements of the isolation units $104_{1-N}$ to isolate and diagnose the cells $106_{1-N}$. The controller 101 is discussed further in FIG. 2.

The controller 101 can select isolation and diagnostic techniques based on circuit configurations of the isolation units $104_{1-N}$. Examples of circuit configurations of the isolation units $104_{1-N}$ are discussed in detail in FIGS. 3A-3C. The isolation and diagnostic techniques are described in FIGS. 4-6.

Figure 2:
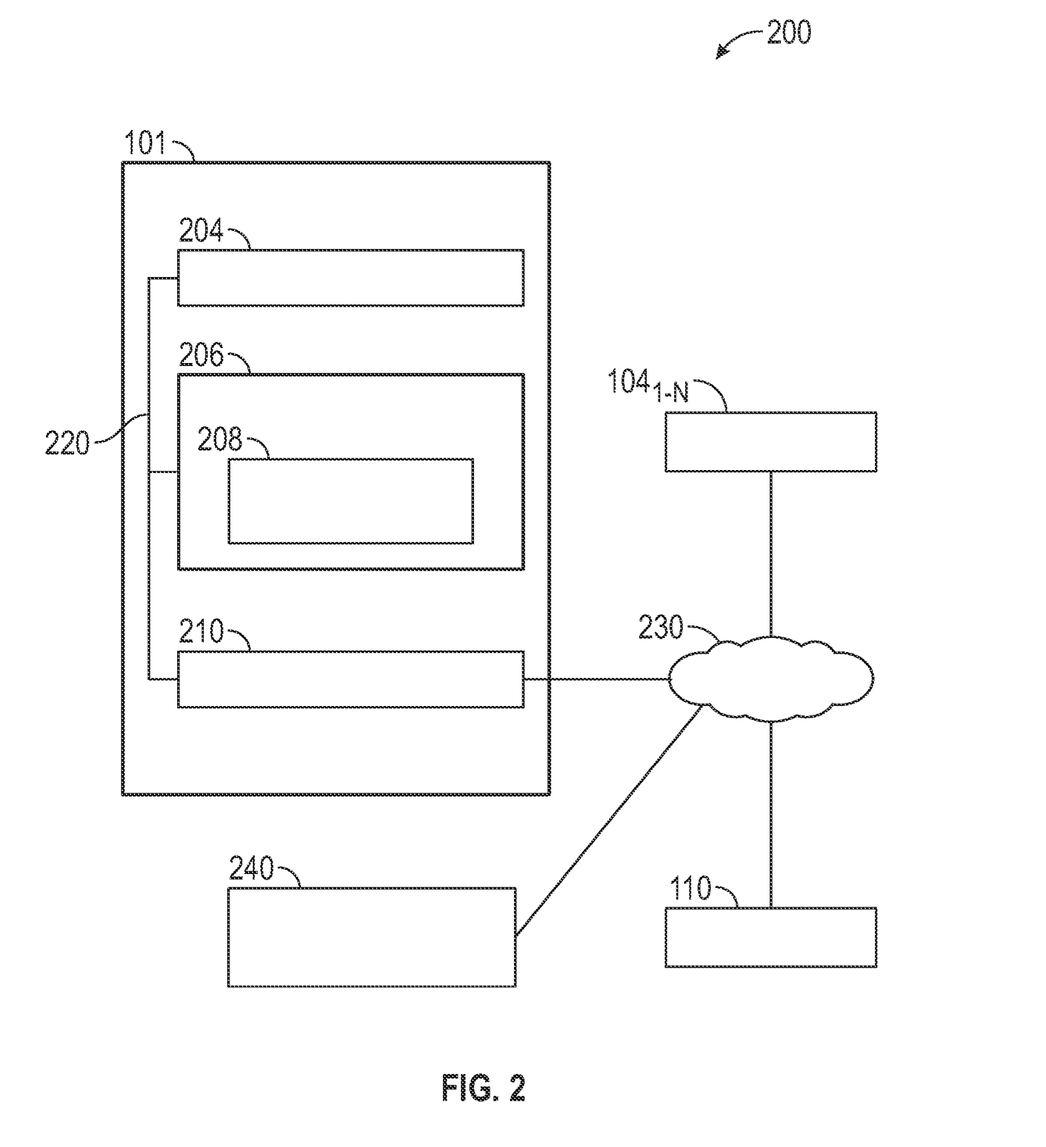
FIG. 2 illustrates a computing environment, according to one embodiment.

FIG. 2 illustrates a computing environment 200, according to one embodiment. In the illustrated embodiment, the computing environment 200 includes a controller 101, a network 230, isolation units $104_{1-N}$, a power source 110, and a complex impedance measurement unit 240. In one embodiment, the controller 101 is a battery management system of a vehicle, and the circuit configuration 102 represents a battery pack of the vehicle.

In one embodiment, the controller 101 includes a processor 204 that obtains instructions and data via a bus 220 from a memory or storage 206. Not all components of the controller 101 are shown. The controller 101 is generally under the control of an operating system (OS) suitable to perform or support the functions or processes disclosed herein. The processor 204 is a programmable logic device that performs instruction, logic, and mathematical processing, and may be representative of one or more CPUs. The processor may execute one or more algorithms, instruction sets, or applications in the memory or storage 206 to perform the functions or processes described herein.

The memory or storage 206 can be representative of hard-disk drives, solid state drives, flash memory devices, optical media, and the like. The memory or storage 206 can also include structured storage (e.g., a database). In addition, the memory or storage 206 may be considered to include memory physically located elsewhere. For example, the memory or storage 206 may be physically located on another computer communicatively coupled to the controller 101 via the bus 220 or the network 230.

The controller 101 can be connected to other computers (e.g., controllers, distributed databases, servers, or web-hosts), the isolation units $104_{1-N}$, the power source 110, or the complex impedance measurement unit 240, via a network interface 210 and/or the network 230. The network 230 can comprise, for example, a local area network, a wide area network, or a wireless network. In one embodiment, the network includes a controller area network (CAN) or transmission control protocol (TCP) bus. The network 230 can also include any combination of busses, physical transmission cables, optical transmission fibers, wireless transmission, routers, firewalls, switches, gateway computers or edge servers. The network interface 210 may be any type of network communications device allowing the controller 101 to communicate with computers and other components of the computing environment 200 via the network 230.

In the illustrated embodiment, the memory or storage 206 includes a battery imbalance mitigation (BIM) module 208. In one embodiment, the BIM module 208 represents one or more algorithms, instruction sets, software applications, or other computer-readable program code that can be executed by the processor 204 to perform the functions, operations, or processes described herein.

The BIM module 208 can control the isolation units $104_{1-N}$ to connect and disconnect the cells $106_{1-N}$ from the circuit configuration 102. In one embodiment, the BIM module 208 disconnects all but one cell (an "isolated" cell) from the circuit configuration 102. Afterwards, the BIM module 208 can control the complex impedance measurement unit 240 to determine a frequency response of the isolated cell. The BIM module 208 can use the frequency response to determine a state of health (SOH) of the isolated cell, and can control the use of the isolated cell based on the SOH. This process is discussed further in FIGS. 4-6 herein.

The complex impedance measurement unit 240 may represent an electrochemical impedance spectroscopy device, a potentiostat, or another device configured to apply input alternating current (AC) signals to the cells $106_{1-N}$, measure output AC signals of the cells $106_{1-N}$, and determine real and imaginary impedance values based on the input AC signals and output AC signals. For instance, the input AC signals may represent voltage signals, and the output AC signals may represent current signals. Hence, the complex impedance measurement unit 240 can divide the voltage signals by the current signals to determine impedance representations of the cells $106_{1-N}$.

In one embodiment, the impedance representations are modeled as Bode plots or Nyquist plots. In one embodiment, the complex impedance measurement unit 240 modulates an AC signal from the power source 110 to apply the input AC signal to the isolation units $104_{1-N}$, which is then applied to the cells $106_{1-N}$.

Figures 3A, 3B:
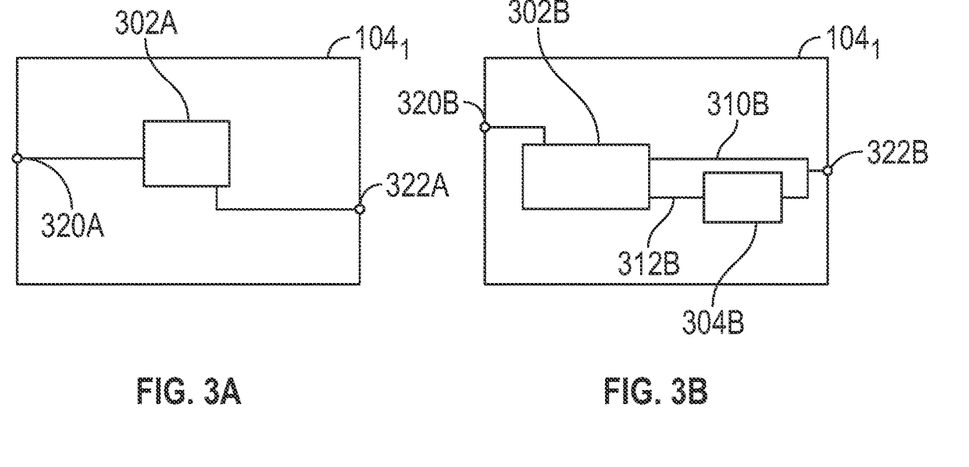
FIGS. 3A-3C illustrate isolation units, according to one or more embodiments.
Figure 3C:
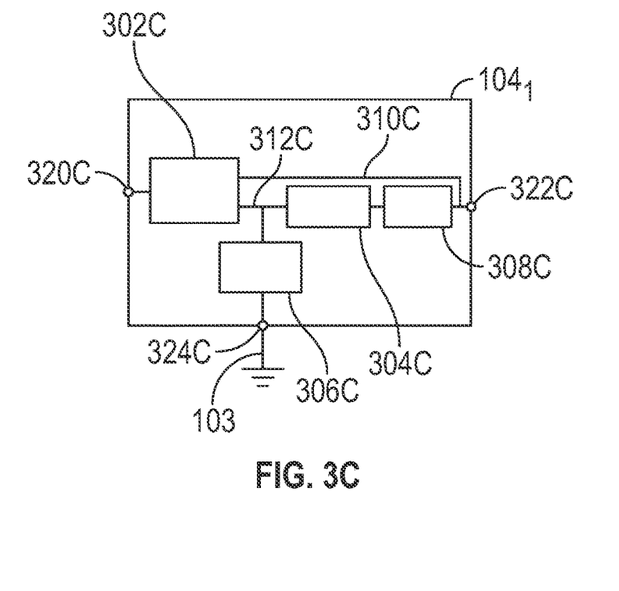

FIGS. 3A-3C illustrate isolation units, according to one or more embodiments. In each of the embodiments illustrated in FIGS. 3A-3C, the isolation unit $104_1$ is representative of a circuit configuration common to all of the isolation units $104_{1-N}$ of the embodiment.

In the embodiment illustrated in FIG. 3A, the isolation unit $104_1$ includes a switch 302A connected to a cell $106_1$ via a first connection point 320A of the isolation unit $104_1$. The switch 302A is also connected to the power source 110 via a second connection point 322A of the isolation unit $104_1$.

The controller 101 can operate the switch 302A to connect or disconnect the cell $106_1$ to the circuit configuration 102. In one embodiment, the controller 101 operates the switch in the isolation units $104_{1-N}$ to isolate and determine an SOH for each of the cells $106_{1-N}$. This process is discussed in detail in FIG. 5 herein.

In the embodiment illustrated in FIG. 3B, the isolation unit $104_1$ includes a switch 302B connected to a cell $106_1$ via a first connection point 320B of the isolation unit $104_1$. The switch 302B is also connected to the power source 110 via an uppermost electrical path 310B that is connected to a second connection point 322B of the isolation unit $104_1$. The switch 302B is also connected to a resistor 304B and the power source 110 via a lowermost electrical path 312B that is connected to the second connection point 322B of the isolation unit $104_1$. The isolation unit $104_1$ may also include an optional additional switch (not shown) connected to the second connection point 322B to connect or disconnect the isolation unit 104₁ from the circuit configuration 102.

The controller 101 can operate the switch 302B to connect the cell 106₁ directly to the power source 110 via the uppermost electrical path 310B, or connect the cell 106₁ to the resistor 304B and the power source 110 via the lowermost electrical path 312B. In one embodiment, the resistor 304B represents an impedance signature of the isolation unit 104₁ facing the cell 106₁. Each of the isolation units 104₁₋ₙ may have a different impedance signature. In one embodiment, the resistor 304B is a variable resistor that can be electromechanically adjusted by the controller 101 to apply a different impedance signature to the cell 106₁. This may be performed for each of the isolation units 104₁₋ₙ to provide a different impedance signature for each of the cells 106₁₋ₙ. Diagnostic techniques for such isolation units 104₁₋ₙ are discussed further in FIG. 6 herein.

In the embodiment illustrated in FIG. 3C, the isolation unit 104₁ includes a switch 302C connected to a cell 106₁ via a first connection point 320C of the isolation unit 104₁. The switch 302C is also connected to the power source 110 via an uppermost electrical path 310C that is connected to a second connection point 322C of the isolation unit 104₁. The switch 302C is also connected to an RC filter (which includes resistor 304C and capacitor 306C) and the power source 110 via a lowermost electrical path 312C that is connected to the second connection point 322C of the isolation unit 104₁. A first end of the capacitor 306C is connected to the lowermost electrical path 312C between the switch 302C and the resistor 304C, and a second end of the capacitor 306C is connected to ground 103 via a third connection point 342C of the isolation unit 104₁.

The controller 101 can operate the switch 302C to connect the cell 106₁ directly to the power source 110 via the uppermost electrical path 310C, or connect the cell 106₁ to the RC filter and the power source 110 via the lowermost electrical path 312C. In one embodiment, the resistor 304C represents an impedance signature of the isolation unit 104₁ facing the cell 106₁. Each of the isolation units 104₁₋ₙ may have a different impedance signature. In one embodiment, the resistor 304C is a variable resistor that can be electromechanically adjusted by the controller 101 to apply a different impedance signature to the cell 106₁. This may be performed for each of the isolation units 104₁₋ₙ to provide a different impedance signature for each of the cells 106₁₋ₙ. Diagnostic techniques for such isolation units 104₁₋ₙ are discussed further in FIG. 6 herein.

Figure 4:
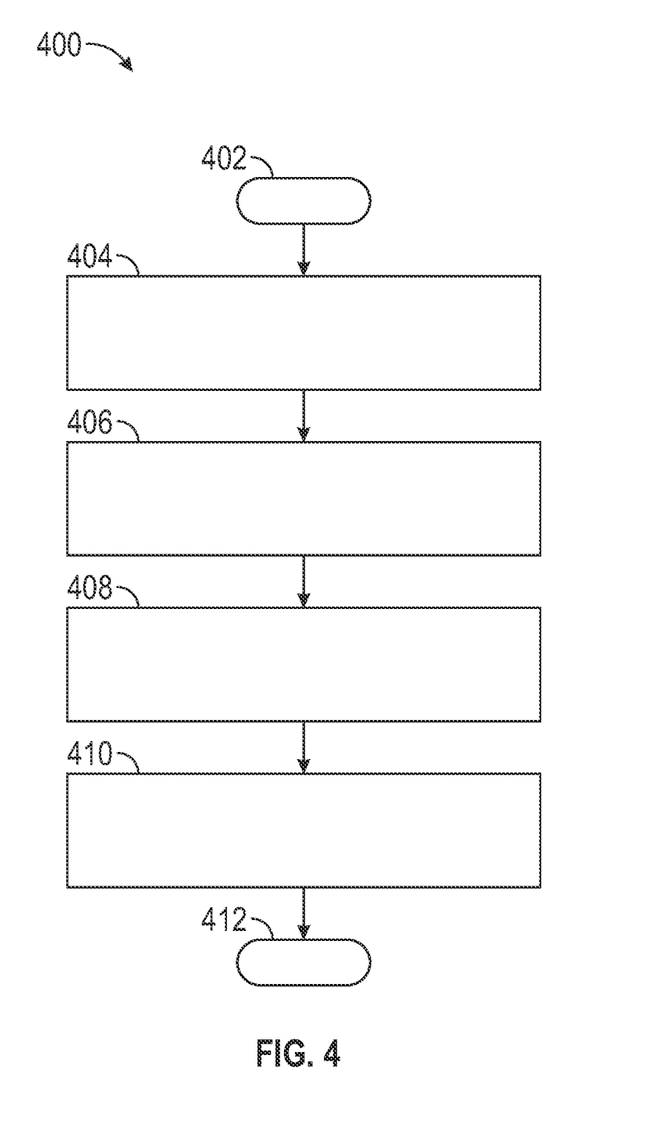
FIG. 4 illustrates a flowchart of a method of diagnosing and mitigating battery imbalances, according to one embodiment.

FIG. 4 illustrates a flowchart of a method 400 of diagnosing and mitigating battery imbalances, according to one embodiment. In one embodiment, the method 400 is performed when the cells are not in a high energy depletion state. For instance, if the cells 106₁₋ₙ are used in a vehicle, then the method may be performed when the vehicle is not moving.

The method begins at block 402. At block 404, the BIM module 208 selects a diagnosis technique based on a circuit configuration of an isolation unit. In one embodiment, when the isolation units 104₁₋ₙ reflect the circuit configuration illustrated in FIG. 3A, the BIM module 208 performs the method described in FIG. 5. When the isolation units 104₁₋ₙ reflect the circuit configurations illustrated in FIGS. 3B-3C, the BIM module 208 performs the model described in FIG. 6.

Figure 5:
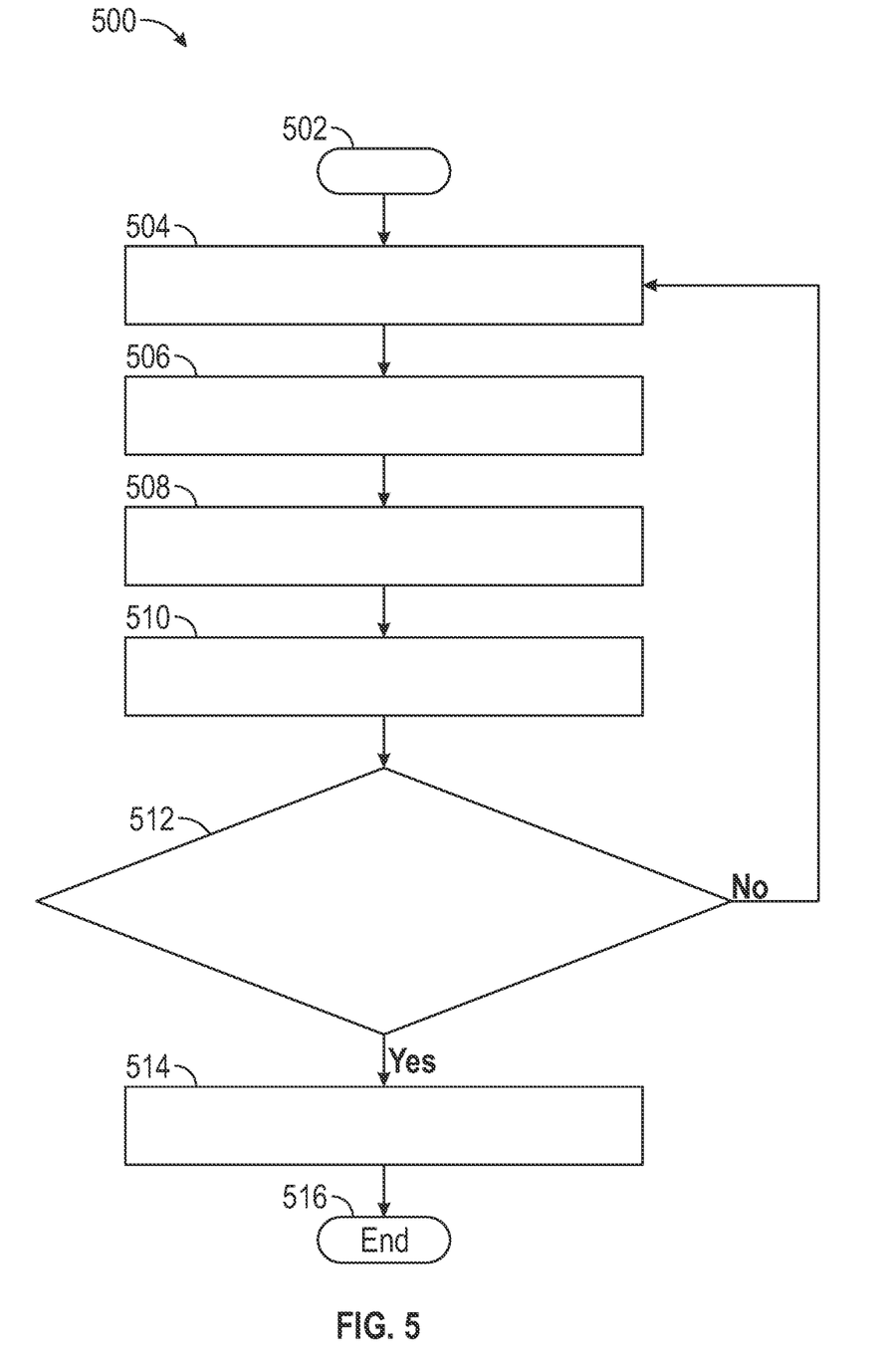
FIG. 5 illustrates a flowchart of a method of diagnosing and mitigating battery imbalances, according to another embodiment.
Figure 6:
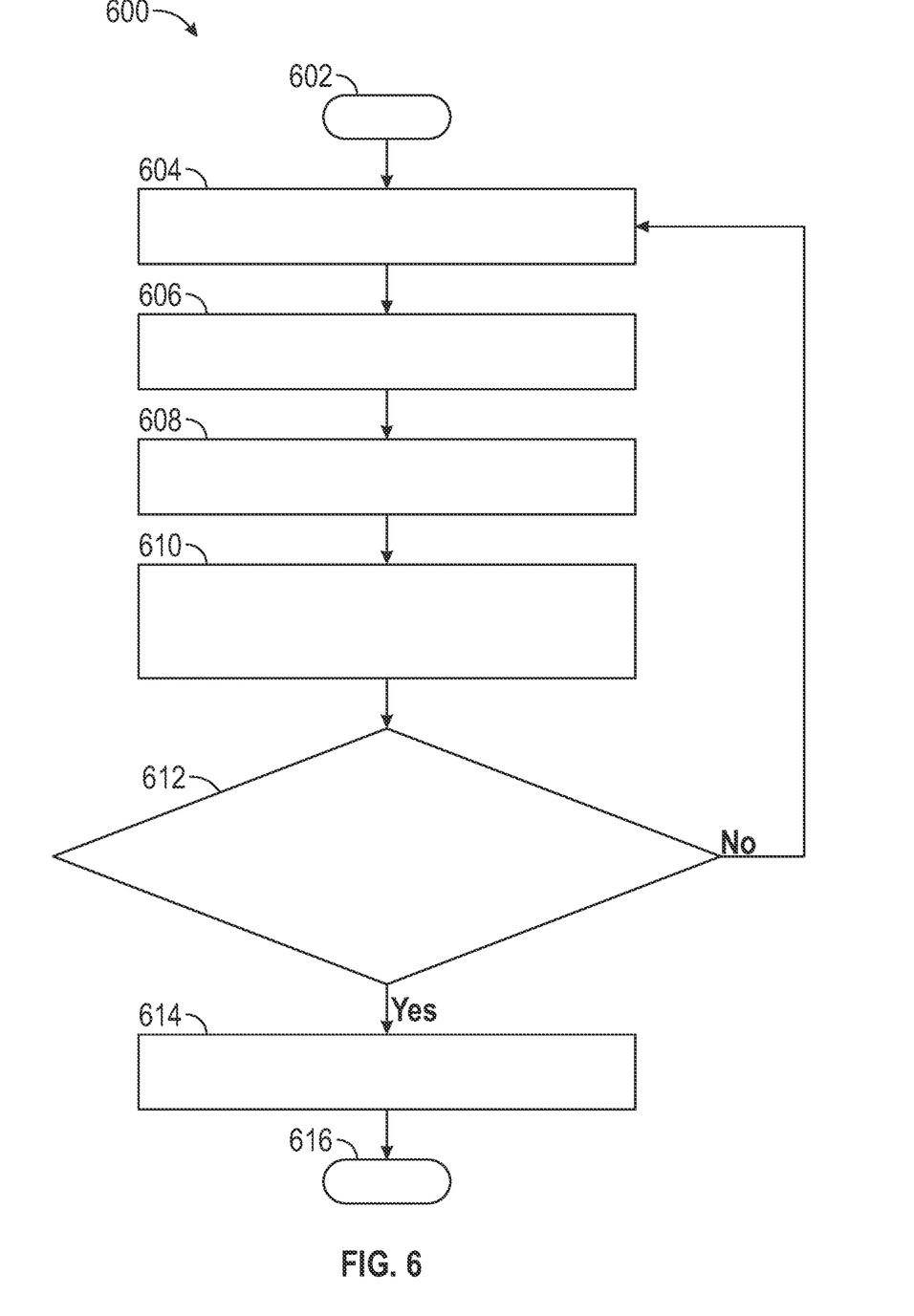
FIG. 6 illustrates a flowchart of a method of diagnosing and mitigating battery imbalances, according to yet another embodiment.

Blocks 406-412 describe general processes of the present disclosure that are explained in further detail in FIGS. 5 and 6. At block 406, the BIM module 208 isolates, via the isolation unit, a cell. As discussed above, in one embodiment, a cell (e.g., cell 106₁) is considered to be isolated when an isolation unit corresponding to the cell is used to connect the cell (or maintain a connection of the cell) to the circuit configuration 102, while disconnecting other cells (e.g., 106₂₋ₙ) from the circuit configuration 102. In one embodiment, some or all of the other cells are disconnected from the circuit configuration. In one embodiment, groupings of cells can be isolated and used in accordance with method 400 to increase the efficiency of battery imbalance diagnosis and mitigation.

At block 408, the BIM module 208 determines, via a complex impedance measurement unit 240, a state of health of the battery cell. The BIM module 208 can identify an SOH using a frequency response of the cell. In one embodiment, the frequency response of a cell represents an impedance profile of the cell that includes real and imaginary impedance values across a frequency range. The BIM module 208 can generate the frequency response by controlling the complex impedance measurement unit 240 to apply an input AC signal to the cell, measure output AC signals of the cells, and determine real and imaginary impedance values based on the input AC signals and output AC signals.

In one embodiment, the SOH of a battery cell represents a remaining useful life of the cell as a ratio of a present condition of the cell to ideal conditions of the cell. The SOH can be depicted as a map or profile that represents the remaining useful life of the cell (e.g., an internal impedance value, a number of expected remaining life cycles, a percentage of remaining charge, or the like) relative to at least one metric (e.g., time, a cycle count, a temperature range, a voltage or current usage, a capacity range of the cell, or the like). The BIM module 208 may determine the SOH of a cell based on the impedance (from the frequency response), the capacity, and the voltage output of the cell.

At block 410, the BIM module 208 controls, via a controller 101, the battery cell based on the state of health. In one embodiment, upon determining that the cell includes a battery imbalance, the BIM module 208 uses an isolation unit to disconnect the cell from the circuit configuration 102 such that the battery pack or cell group can supply power without contribution of the disconnected cell. A battery imbalance may be representative of an increased impedance or energy depletion of one cell of circuit configuration 102 relative to at least one other cell of the circuit configuration 102.

The BIM module 208 can also determine the SOH of the other cells of the circuit configuration 102 over time. In one embodiment, upon determining that a difference between a SOH value of the disconnected cell and a SOH value of one or more of the other cells (or an average of the states of health of the other cells) exceeds a threshold, the BIM module 208 can use the isolation unit to reconnect the disconnected cell to the circuit configuration 102. In this manner, the BIM module 208 can control the energy imbalance of the cells and mitigate risks posed by using a battery pack or cell group that includes an imbalanced cell. The method 400 ends at block 412.

FIG. 5 illustrates a flowchart of a method 500 of diagnosing and mitigating battery imbalances, according to another embodiment. The method 500 depicts one example of battery imbalance diagnoses and mitigation when the isolation units 104₁₋ₙ reflect a circuit configuration shown in FIG. 3A. The method 500 begins at block 502.

At block 504, the BIM module 208 isolates a first battery cell from a plurality of battery cells. The BIM module 208 can control a switch of an isolation unit (e.g., switch 302A)

to connect or disconnect a cell from the circuit configuration 102. As described herein, in one embodiment, the first battery cell is considered to be isolated when the first battery cell (e.g., cell $106_1$) is connected to (or maintains a connection with) the circuit configuration 102, and other cells (e.g., cells $106_{2-N}$) are disconnected from the circuit configuration 102.

At block 506, the BIM module 208 determines a state of health of the first battery cell. As described herein, the BIM module 208 can control the complex impedance measurement unit 240 to generate a frequency response of the first battery cell. The BIM module 208 can then determine the SOH based on the capacity, voltage, and frequency response of the first battery cell. In one embodiment, the SOH of the first battery represents a feature of the remaining useful life (e.g., an internal impedance value, a number of expected remaining life cycles, a percentage of remaining charge, or the like) of the first battery cell.

At block 508, the BIM module 208 isolates a second battery cell from the plurality of battery cells. At block 510, the BIM module 208 determines an SOH of the second battery cell. The method 500 can perform these processes in a manner similar to the processes performed at block 504 and block 506.

At block 512, the BIM module 208 determines whether a difference between the state of health of the first battery cell and the state of health of the second battery cell exceeds a state of health threshold. Upon determining that the SOH threshold has not been exceeded, the BIM module 208 determines that the first battery cell and the second battery cell are not imbalanced. Therefore, the method 500 proceeds to block 504, where it performs as described above. However, upon determining that the SOH threshold has been exceeded, the BIM module 208 determines that there is an imbalance between the first battery cell and the second battery cell. The method 500 then proceeds to block 514.

At block 514, the BIM module 208 controls the first battery cell or the second battery cell. In one embodiment, the BIM module 208 uses an isolation unit to disconnect the first battery cell or the second battery cell from the circuit configuration 102 based on SOH values corresponding to the cells (e.g., the BIM module 208 can disconnect the cell with a lower remaining useful life). The method 500 ends at block 516.

FIG. 6 illustrates a flowchart of a method 600 of diagnosing and mitigating battery imbalances, according to yet another embodiment. The method 600 depicts one example of battery imbalance diagnoses and mitigation when the isolation units $104_{1-N}$ reflect a circuit configuration shown in FIGS. 3B-3C. The method 600 begins at block 602.

At block 604, the BIM module 208 isolates a battery cell from a plurality of battery cells. When the circuit configuration of the isolation units $104_{1-N}$ reflect the circuit configuration illustrated in FIG. 3B, the BIM module 208 can control a switch (e.g., switch 302B) of an isolation unit (e.g., isolation unit $104_1$) to directly connect a cell (e.g., cell $106_1$) to the power source 110 via a first electrical path of the isolation unit $104_1$. The BIM module 208 can also control the switch 302B to connect to the power source 110 via a resistor 304B in a second electrical path of the isolation unit $104_1$.

In one embodiment, the cell $106_1$ is considered to be isolated when connected to the power source 110 via the first electrical path, while other cells (e.g., cells $106_{2-N}$) are connected to the power source 110 via the second electrical path of corresponding isolation units (e.g., isolation units $104_{2-N}$). In this manner, the BIM module 208 can assess a frequency response of the isolated cell based on an original impedance profile of the circuit configuration of the isolation units $104_{1-N}$.

In another embodiment, the cell $106_1$ is considered to be isolated when connected to the power source 110 via the second electrical path. Isolating cells $106_{1-N}$ via the second electrical path allows the circuit components of the isolation units $104_{1-N}$ to serve as impedance signatures facing the cells $106_{1-N}$. In one embodiment, the BIM module 208 can change the impedance signatures of the isolation units $104_{1-N}$. For instance, the BIM module 208 can apply different electromechanical adjustments to variable resistors of different isolation units. Hence, the impedance signatures can be used to isolate a frequency response of each of the cells $106_{1-N}$ by shifting an impedance signature facing one cell to a different impedance range that does not overlap with the impedance signature of another cell.

When the circuit configuration of the isolation units $104_{1-N}$ reflect the circuit configuration illustrated in FIG. 3C, the BIM module 208 can control switches of an isolation unit (e.g., switch 302C and 308C) to connect or disconnect a cell (e.g., cell $106_1$) from the circuit configuration 102. When connecting the cell $106_1$ to the circuit configuration 102, the BIM module 208 can connect a cell directly to the power source 110 via a first electrical path of the isolation unit $104_1$. The BIM module 208 can also control the switch 302C to connect to the power source 110 via an RC filter (which includes resistor 304C and capacitor 306C) in a second electrical path of the isolation unit $104_1$.

In one embodiment, the cell $106_1$ is considered to be isolated when connected to the power source 110 via the first electrical path, while other cells (e.g., cells $106_{2-N}$) are connected to the power source 110 via the second electrical path of corresponding isolation units (e.g., isolation units $104_{2-N}$). In this manner, an impedance response of a cell isolated via the first electrical path can be readily distinguished from an impedance response of a cell that is connected to the second electrical path (whose signal is filtered out at a common frequency range by the RC filters).

At block 606, the BIM module 208 determines a target frequency range of a frequency response. In one embodiment, the target frequency range represents a minimum frequency range that captures an expected impedance response range of the battery cell and an isolation unit corresponding to the battery cell. For isolation units $104_{1-N}$ that reflect the circuit configurations illustrated in FIGS. 3B, the target frequency range can be determined based on the impedance of a battery cell and the impedance signature of the isolation unit facing the battery cell. For isolation units $104_{1-N}$ that reflect the circuit configurations illustrated in FIGS. 3C, the target frequency range can be determined based on the impedance of the isolated battery cell.

At block 608, the BIM module 208 determines the frequency response across the target frequency range. In one embodiment, the frequency response of a cell represents an impedance profile of the cell that includes real and imaginary impedance values across the target frequency range. The BIM module 208 can generate the frequency response by controlling the complex impedance measurement unit 240 to apply an input AC signal to the cell, measure output AC signals of the cells, and determine real and imaginary impedance values based on the input AC signals and output AC signals.

During this process, the BIM module 208 may also perform a switching pattern test to whether there is an error in the switching mechanisms of the isolation units 1401-N. For example, the BIM module 208 can use predetermined impedances of the isolation units $104_{1-N}$ to generate an expected impedance range of the isolation units $104_{1-N}$. When measured impedances of the isolation units 1401-N are outside of the expected impedance range, the BIM module 208 can determine that measured impedances reflect an error in the switching mechanisms, which may have caused an unintended aggregation, or removal from the circuit configuration 102, of isolation units $104_{1-N}$ whose impedances were measured.

At block 610, the BIM module 208 determines a state of health of the battery cell based on the frequency response. In one embodiment, the SOH of a battery cell represents a remaining useful life of the cell as ratio of a present condition of the cell to ideal conditions of the cell. The SOH can be depicted as a map or profile that represents a present, remaining useful life (e.g., an internal impedance value, a number of expected remaining life cycles, a percentage of remaining charge, or the like) of the cell relative to at least one metric (e.g., time, a cycle count, a temperature range, a voltage or current usage, a capacity range of the cell, or the like). The BIM module 208 may determine the SOH of a cell based on the impedance (from the frequency response), the capacity, and the voltage output of the cell.

At block 612, the BIM module 208 determines whether a difference between the state of health of the battery cell and a state of health estimation map exceeds a battery imbalance threshold. In one embodiment, the SOH estimation map represents an expected remaining useful life of the cell at the beginning of its use in the circuit configuration 102. In another embodiment, the SOH map represents an expected lifespan profile of a cell that is generated when the cell is created.

Upon determining that the difference does not exceed the battery imbalance threshold, the BIM module 208 determines that the remaining useful life of the cell does not deviate from expectations, and there is no imbalance (e.g., a raised internal impedance) of the battery cell. Hence, the method 600 proceeds to block 604, where it performs as described above. However, upon determining that the difference does exceed the battery imbalance threshold, the BIM module 208 determines that the remaining useful life of the cell deviates from expectations, and there is an imbalance of the battery cell. The method 600 then proceeds to block 614.

At block 614, the BIM module 208 controls the battery cell based on the state of health of the battery cell. In one embodiment, when the cell includes an imbalance, the BIM module 208 uses an isolation unit to disconnect the cell from the circuit configuration 102 such that the battery pack or cell group can supply power without contribution of the disconnected cell.

The BIM module 208 can also determine the SOH of the other cells of the circuit configuration 102 over time. In one embodiment, upon determining that a difference between an SOH of the disconnected cell and an SOH of one or more of the other cells (or an average of the states of health of the other cells) exceeds a threshold, the BIM module 208 can use an isolation unit to reconnect the disconnected cell to the circuit configuration 102. In this manner, the BIM module 208 can control the energy imbalance of the cells and mitigate risks posed by using a battery pack or cell group that includes an imbalanced cell. The method 600 ends at block 616.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method comprising:
    isolating, via a first isolation unit, a first battery cell from a plurality of battery cells wherein the first isolation unit includes a first connection point connected to a first end of a switch, wherein a second end of the switch is connected to a first electrical path, and wherein a third end of the switch is connected to a second electrical path, and a second connection point connected to the first electrical path and the second electrical path, wherein the second electrical path includes a resistor or an RC filter;
    determining, via a complex impedance measurement unit, a state of health of the first battery cell; and
    controlling, via a controller, the first battery cell based on the state of health of the first battery cell.

2. The method of claim 1, wherein the first isolation unit comprises:
    the second connection point being connected to the second end of the switch.

3. The method of claim 2, further comprising:
    isolating, via a second isolation unit, a second battery cell from the plurality of battery cells;
    determining, via the complex impedance measurement unit, a state of health of the second battery cell; and
    determining, via the controller, that a difference between the state of health of the first battery cell and the state of health of the second battery cell exceeds a state of health threshold, wherein the difference indicates that a remaining useful life of the first battery cell is less than a remaining useful life of the second battery cell, and wherein the first battery cell is controlled by disconnecting the first battery cell from the plurality of battery cells via the first isolation unit.

4. The method of claim 1, further comprising:
determining, via the controller, a target frequency range of a frequency response;
determining, via the complex impedance measurement unit, the frequency response across the target frequency range;
determining, via the controller, a state of health of the first battery cell based on the frequency response; and
determining, via the controller, that a difference between the state of health of the first battery cell and a state of health estimation map exceeds a battery imbalance threshold, wherein the first battery cell is controlled based on the state of health of the first battery cell.

5. The method of claim 1, wherein the complex impedance measurement unit represents a device configured to apply an input AC signal to the first battery cell, measure an output AC signal of the first battery cell, and determine real and imaginary impedance values based on the input AC signal and the output AC signal.

6. The method of claim 1, wherein the state of health of the first battery cell is a map or profile that represents a remaining useful life of the first battery cell relative to at least one metric, wherein the remaining useful life of the first battery cell comprises at least one of: an internal impedance value, a number of expected remaining life cycles, or a percentage of remaining charge, and wherein the at least one metric comprises: time, a cycle count, a temperature range, a voltage or current usage, or a capacity range of the first battery cell.

7. The method of claim 1, wherein the complex impedance measurement unit includes at least one of an electrochemical impedance spectroscopy device and a potentiostat.

8. A vehicle power control system, comprising:
a plurality of battery cells;
a first isolation unit;
a complex impedance measurement unit;
a processor; and
memory or storage comprising an algorithm or computer instructions, which when executed by the processor, performs an operation comprising:
isolating, via the first isolation unit, a first battery cell from the plurality of battery cells wherein the first isolation unit includes a first connection point connected to a first end of switch, wherein a second end of the switch is connected to a first electrical path, and wherein a third end of the switch is connected to a second electrical path, and a second connection point connected to the first electrical path and the second electrical path, wherein the second electrical path includes a resistor or an RC filter;
determining, via the complex impedance measurement unit, a state of health of the first battery cell; and
controlling, via the processor, the first battery cell based on the state of health of the first battery cell.

9. The vehicle power control system of claim 8, wherein the first isolation unit comprises:
the second connection point being connected to the second end of the switch.

10. The vehicle power control system of claim 9, the operation further comprising:
isolating, via a second isolation unit, a second battery cell from the plurality of battery cells;
determining, via the complex impedance measurement unit, a state of health of the second battery cell; and
determining, via the processor, that a difference between the state of health of the first battery cell and the state of health of the second battery cell exceeds a state of health threshold, wherein the difference indicates that a remaining useful life of the first battery cell is less than a remaining useful life of the second battery cell, and wherein the first battery cell is controlled by disconnecting the first battery cell from the plurality of battery cells via the first isolation unit.

11. The vehicle power control system of claim 8, the operation further comprising:
determining, via the processor, a target frequency range of a frequency response;
determining, via the complex impedance measurement unit, the frequency response across the target frequency range;
determining, via the processor, a state of health of the first battery cell based on the frequency response; and
determining, via the processor, that a difference between the state of health of the first battery cell and a state of health estimation map exceeds a battery imbalance threshold, wherein the first battery cell is controlled based on the state of health of the first battery cell.

12. The vehicle power control system of claim 8, wherein the complex impedance measurement unit represents a device configured to apply an input AC signal to the first battery cell, measure an output AC signal of the first battery cell, and determine real and imaginary impedance values based on the input AC signal and the output AC signal.

13. The vehicle power control system of claim 8, wherein the state of health of the first battery cell is a map or profile that represents a remaining useful life of the first battery cell relative to at least one metric, wherein the remaining useful life of the first battery cell comprises at least one of: an internal impedance value, a number of expected remaining life cycles, or a percentage of remaining charge, and wherein the at least one metric comprises: time, a cycle count, a temperature range, a voltage or current usage, or a capacity range of the first battery cell.

14. The vehicle power control system of claim 8, wherein the complex impedance measurement unit includes at least one of an electrochemical impedance spectroscopy device and a potentiostat.

15. A non-transitory computer-readable storage medium having a computer-readable program code embodied therewith, the computer-readable program code executable by one or more computer processors to perform an operation comprising:
isolating, via a first isolation unit, a first battery cell from a plurality of battery cells, wherein the first isolation unit comprises:
a first connection point connected to a first end of switch, wherein a second end of the switch is connected to a first electrical path, and wherein a third end of the switch is connected to a second electrical path; and
a second connection point connected to the first electrical path and the second electrical path, wherein the second electrical path includes a resistor or an RC filter;
determining, via a complex impedance measurement unit, a state of health of the first battery cell; and
controlling, via a controller, the first battery cell based on the state of health of the first battery cell.

16. The non-transitory computer-readable storage medium of claim 15, wherein the first isolation unit comprises:
the second connection point being connected to the second end of the switch.

17. The non-transitory computer-readable storage medium of claim 16, the operation further comprising:

isolating, via a second isolation unit, a second battery cell from the plurality of battery cells determining, via the complex impedance measurement unit, a state of health of the second battery cell; and determining, via the controller, that a difference between the state of health of the first battery cell and the state of health of the second battery cell exceeds a state of health threshold, wherein the difference indicates that a remaining useful life of the first battery cell is less than a remaining useful life of the second battery cell, and wherein the first battery cell is controlled by disconnecting the first battery cell from the plurality of battery cells via the first isolation unit.

18. The non-transitory computer-readable storage medium of claim 15, the operation further comprising:

determining, via the controller, a target frequency range of a frequency response determining, via the complex impedance measurement unit, the frequency response across the target frequency range determining, via the controller, a state of health of the first battery cell based on the frequency response determining, via the controller, that a difference between the state of health of the first battery cell and a state of health estimation map exceeds a battery imbalance threshold, wherein the first battery cell is controlled based on the state of health of the first battery cell.

19. The non-transitory computer-readable storage medium of claim 15, wherein the state of health of the first battery cell is a map or profile that represents a remaining useful life of the first battery cell relative to at least one metric, wherein the remaining useful life of the first battery cell comprises at least one of: an internal impedance value, a number of expected remaining life cycles, or a percentage of remaining charge, and wherein the at least one metric comprises: time, a cycle count, a temperature range, a voltage or current usage, or a capacity range of the first battery cell.

20. The non-transitory computer readable medium of claim 15, wherein the complex impedance measurement unit includes at least one of an electrochemical impedance spectroscopy device and a potentiostat.

* * * * *